UNITED STATES PATENT OFFICE.

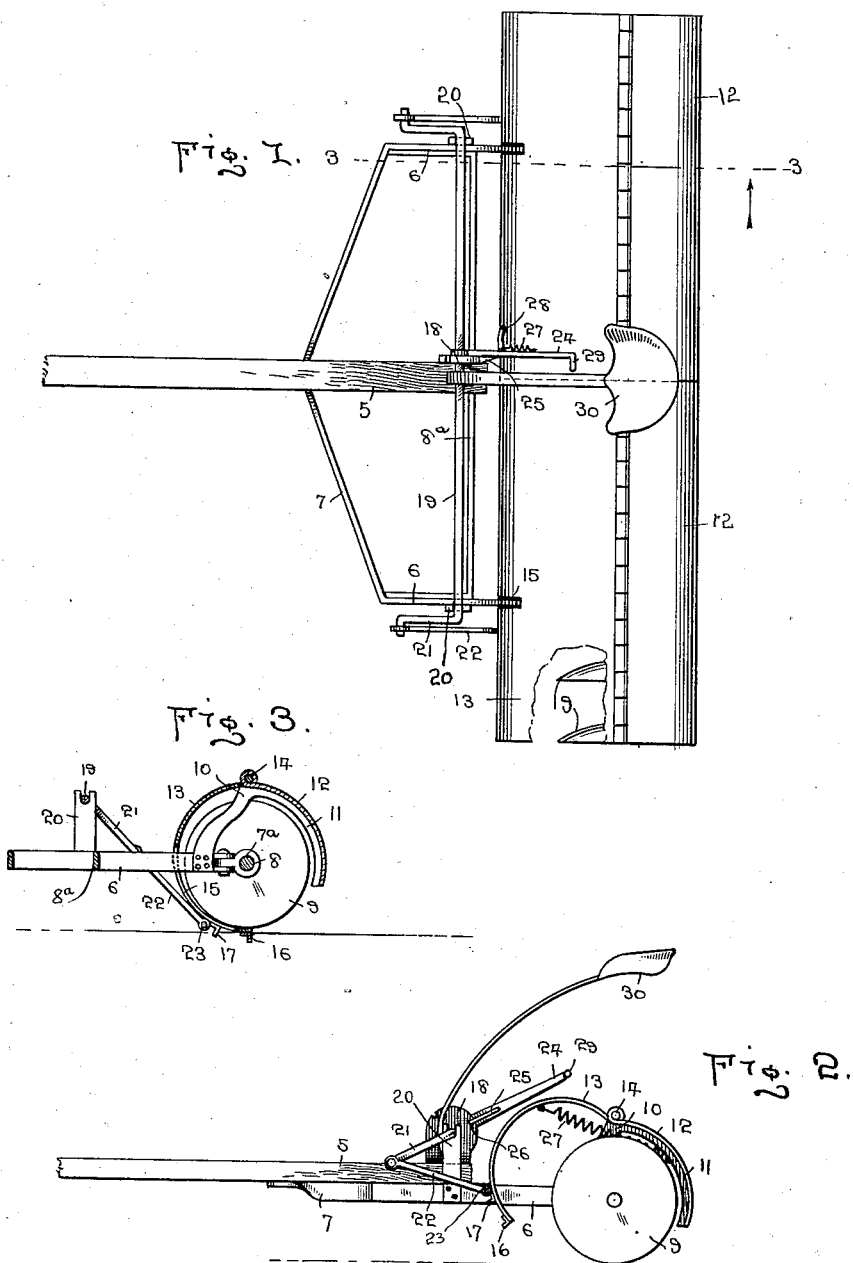
A. POHL.
SAFETY GUARD FOR AGRICULTURAL IMPLEMENTS.
APPLICATION FILED MAR. 19, 1913.
1,074,460.
Patented Sept. 30, 1913.

ARTHUR POHL, OF BLOOMFIELD, NEBRASKA.

SAFETY-GUARD FOR AGRICULTURAL IMPLEMENTS.

1,074,460.　　　　　Specification of Letters Patent.　　Patented Sept. 30, 1913.

Application filed March 19, 1913. Serial No. 755,422.

*To all whom it may concern:*

Be it known that I, ARTHUR POHL, a citizen of the United States, residing at Bloomfield, in the county of Knox and State of Nebraska, have invented certain new and useful Improvements in Safety-Guards for Agricultural Implements; and I do hereby declare the following to be a full, clear, and exact description of the invention, such as will enable others skilled in the art to which it appertains to make and use the same.

This invention relates to guards for agricultural implements, and more particularly for disk harrows, land rollers, etc.

The primary object of the invention is to provide a movable safety guard having means connected therewith for normally retaining it in such relation to a roller or disks that the operation thereof is not interfered with, and at the same time, allowing the shield or guard to move into such relation to the roller as to render them inoperative, in case of certain accidents or necessities.

Another object of the invention is to provide a device of this character which is entirely automatic in its operation.

Another object is to provide a shield of this character which not only shields the operator and the draft animal from danger of being run over by the agricultural implement, in case of his team attempting to run away, but actually and effectively prevents the team from running away.

In the accompanying drawings, Figure 1 is a plan view of a disk harrow having my improved shield mounted thereon. Fig. 2 is a side elevation of a disk harrow and shield shown in Fig. 1, and, Fig. 3 is a vertical sectional view on the line 3—3 of Fig. 1, illustrating the shield in closed or disk locking position.

Referring to the drawings, in which similar reference characters correspond with like parts throughout the several views, the disk harrow mechanism is only illustrated for the purpose of showing the mount of my improved shield, and it should be clearly understood that such shield is quickly applicable to a land roller, and that the principles involved may also be applied to other classes of farm implements and machinery. The form of disk harrow illustrated consists of the tongue 5, lateral bars 6, forward struts 7 and rear struts 8ª. The bars 6 are supported by bearings 7ª journaled on axle 8, supported by and rotatable with the disks or other rotary elements 9. Standards 10 are secured on the rear ends of the bars 6, extending upwardly and rearwardly therefrom, and have secured through the upper ends thereof a shaft or pivot 14. From the pivot point 14 the standards are extended downwardly and rearwardly and curved in conformity with the peripheral surface of the rotary element 9, as at 11. A two part guard 12 is pivoted over the pivot 14 and extends downwardly and rearwardly therefrom and normally rests upon the downwardly extending portions 11 of the standards 10. A second or forward guard 13 is also hinged to the pivot 14 and is normally held in upper or open position by the means hereinafter described.

As shown in Figs. 2 and 3, the forward and rear guards 13 and 12, respectively, represent in cross section, segments of a circle of somewhat larger diameter than that of the disk elements 9. The guard 13 is formed in two parts, as indicated by the dotted line in Fig. 1, and is formed with slots 15 through which the bars 6 extend, said slots being of sufficient length to permit a considerable swing of the element 13 upward and downward. The lower edge of the plate 13 carries one or more longitudinally extending angle beams 16 and 17, which are rigidly secured thereto by any proper means. A notched segment 18 is mounted upon the tongue 5 and forms a central bearing for the crank shaft 19, the ends of which are supported in bearings 20 carried by the lateral bars 6. The arms 21 of the crank shaft are pivotally connected with links 22, each of which is connected at 23 with a part of the forward guard 13. Rigidly secured upon the shaft 19 adjacent the notched segment 18 is an operating lever 24 carrying the pawl or latch 25, which latter engages with the notch 26. The latch 25 is pivoted through a slot in the lever 24 and extends upon the opposite side thereof, a spring 27 being provided for holding the latch out of the notches. A foot rest or pedal 28 is formed on the free end of the latch, and a handle 29 is formed on the end of the lever 24.

An ordinary driver seat 30 is mounted on the frame, and is located rearwardly of the lever 24 and its adjuncts, so that the handle 29 may be grasped for swinging the lever rearward so as to coact with the elements 19, 20 and 22 for swinging the shield 13 upward into open position.

In order to prevent the shields 12 and 13 from jostling and rattling at their pivotal connection, a retractable spring 27 is secured at opposite ends to the front and rear shields 13 and 12 respectively. This spring also assists gravity in quickly drawing the shield 13 to closed position in case of emergency.

In operation, the driver sits on the seat 30 with one foot on the pedal 28 so as to hold the latch 25 within the notch 26; having first drawn the lever 24 rearwardly, into the position illustrated. While thus holding the shield 13 in its upper and open position, the machine may be drawn over the land and operated in the usual manner. However, in case of an accident or contingency that will cause the driver to fall from his seat 30, and he should fall backwardly or laterally, he will be protected from falling on the sharp edges of the disks 9 by means of the shield elements 12 and 13, especially the latter, which being higher than the two, will sustain the greater impact. This element 13 as well as the crank shaft 19 are made of somewhat springy material and so the impact of the fall will be considerably diminished. In the foregoing, we have assumed that one foot of the operator has remained on the lever 28 while he was falling, but in case of such contingency that would pitch the driver forward, so as to dislodge his foot from the pedal 28 and he should fall upon the ground in front of the machine, it is obvious that he would be in imminent peril of being mutilated by the disks 9 unless some means of prevention be immediately employed. Now, it will be observed, that as soon as the operator's foot becomes dislodged from the pedal 28 even before he has completed his fall, the spring 27 pulls the latch 25 out of engagement with the segment 18 so that the shield 13 automatically moves into closed position, or that illustrated in Fig. 3, and the forward motion of the other machine elements causes the disks 9 to ride upon the lower portion of the parts of the shield 13 so as to press the flanges 16 and 17 into the ground and to effect such engagement therewith as to absolutely stop the draft animals. It will also be obvious that this improved shield constitutes an effective means for preventing the draft animals from becoming injured by the rotary element while the latter is in motion. The forward guard 13 also provides an efficient means for preventing the draft animals from running away, and it is only necessary for the operator to release the latch 25 to permit the guard to drop downwardly and assume the position shown in Fig. 3 so that the machine is securely anchored to the ground and prevented from movement thereover.

It will be seen that I have provided a device of this character which is fully capable of attaining the foregoing objects, in a thoroughly practical and efficient manner.

I do not limit myself to the exact details of construction, combination and relation of parts, as herewith illustrated and described, but my invention may only be limited by a reasonable interpretation of the claims.

I claim:

1. In combination with a roller having means associated therewith whereby it may be caused to roll upon the ground, a movable shield supported over the roller and adapted to be normally held above the ground by an operator and to swing downward into engagement with the ground and into contact with the roller, for stopping the motion of the roller.

2. In combination with a roller having means associated therewith whereby it may be caused to roll upon the ground, a movable shield supported over the roller and adapted to be normally secured above the ground by an operator and to swing downward into engagement with the ground when released by the operator, for stopping the motion of the roller.

3. In an attachment for a machine having rollers adapted to roll upon the ground, a movable guard hingedly supported above the roller, a crank-shaft in connection with the roller, a link connecting the crank-shaft with the guard, a lever secured to the crank shaft, a notched segment concentric with the crank-shaft, a latch carried by the lever and adapted to be held in a notch of the segment by an operator, and to coact with the segment and with the crank-shaft and link for holding the guard in an elevated position, said latch having means associated therewith for automatically releasing it from the notch when the latch is released by the operator.

4. A guard for a disk harrow or roller consisting of a curved plate of somewhat springy material and normally supported over the disks of said disk harrow and out of contact with the ground, for preventing a person from falling onto said disks and for minimizing the impact of the fall, and means associated with the guard for holding it in its normal position and allowing it to automatically engage with the ground when said person falls.

In testimony whereof I have signed my name to this specification in the presence of two subscribing witnesses.

ARTHUR POHL.

Witnesses:
CARL G. STOLL,
W. D. FUNK.

Copies of this patent may be obtained for five cents each, by addressing the "Commissioner of Patents, Washington, D. C."